June 11, 1940.　　　　E. F. PIERCE　　　　2,203,843
MULTISPEED SUPERCHARGER
Filed June 3, 1938
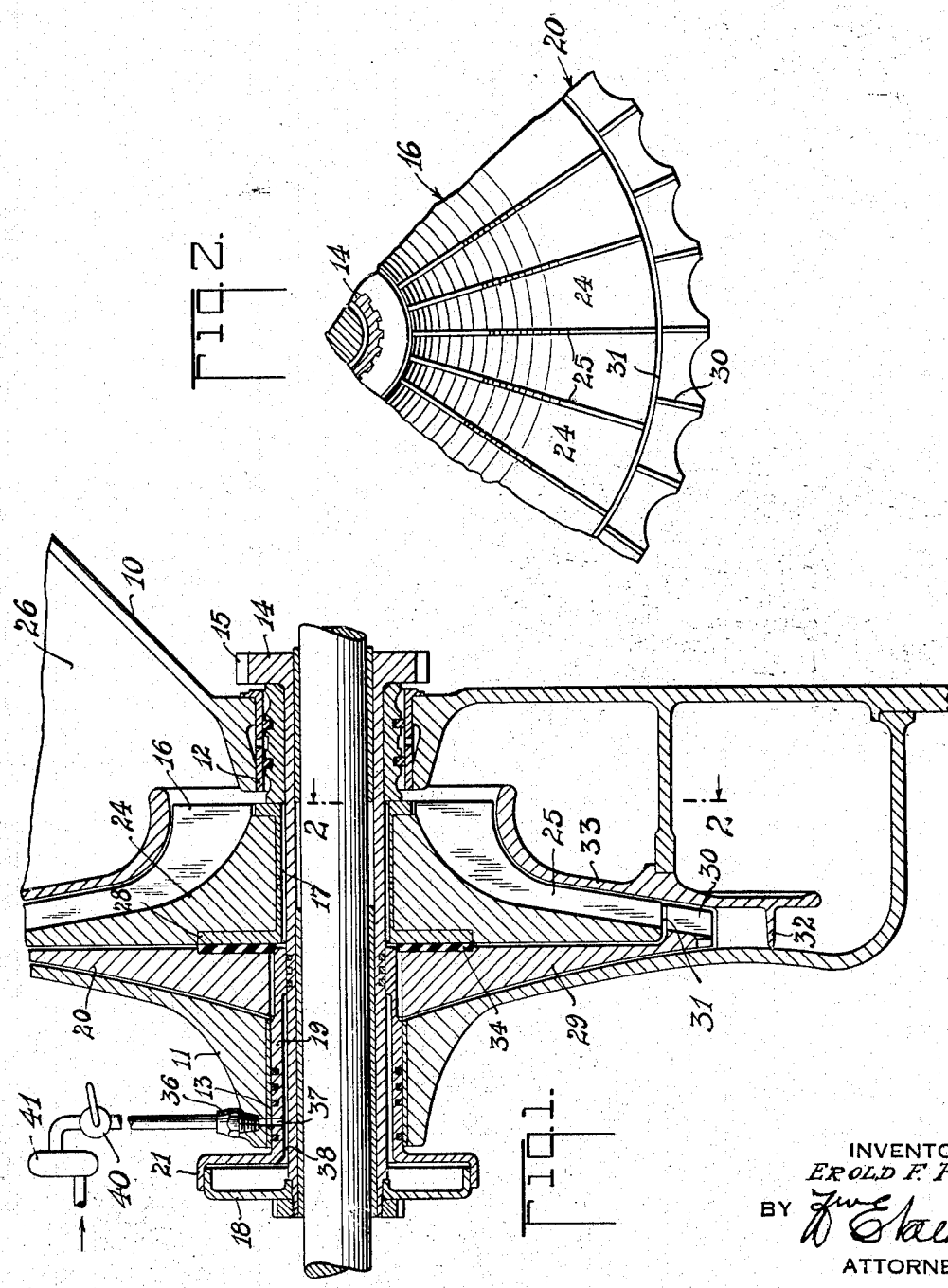
INVENTOR
EROLD F. PIERCE
BY
ATTORNEY Patented June 11, 1940

2,203,843

UNITED STATES PATENT OFFICE 2,203,843

MULTISPEED SUPERCHARGER

Erold F. Pierce, Pines Lake, N. J., assignor to Wright Aeronautical Corporation, a corporation of New York Application June 3, 1938, Serial No. 211,494

6 Claims. (Cl. 230—131)

This invention relates to variable capacity blowers, and is particularly useful as applied to aircraft engine superchargers.

In the aircraft engine art, multispeed superchargers have become necessary to provide maximum power outputs at high altitudes, and the multispeed organization ordinarily comprises a selective step gearing by which the supercharger impeller may be driven at various ratios with respect to engine crankshaft speed. This step gearing involves considerable complication, and one of the objects of this invention is to provide a multispeed supercharger which avoids the necessity of change speed gearing.

A further object of the invention is to provide a variable speed blower or supercharger incorporating impellers of different diameters adapted to be selectively driven at uniform speed. When the large diameter impeller is in operation, the greater peripheral speed thereof affords a supercharger boost greater than that which the small diameter impeller can supply by itself. When low boost is required, the large diameter impeller may be drivably disconnected so it can idle freely, wherefore it does not interfere with the boost caused by the small impeller but, of itself, does no work upon the air or other fluid which is being worked upon.

Other objects and advantages will be apparent from a reading of the annexed specification and claims, together with an examination of the accompanying drawing, in which:

Fig. 1 is a longitudinal section through a variable capacity supercharger according to the invention, and Fig. 2 is a fragmentary end elevation of the supercharger impellers taken on the line 2—2 of Fig. 1.

For purposes of illustrating the invention, I have chosen to show it in an environment appropriate to an airplane engine supercharger. In Fig. 1, 10 and 11, respectively, represent housing members within which the supercharger is carried, said members normally forming a part of an engine crankcase system. The members 10 and 11 are provided with bearings 12 and 13, respectively, within which a plurality of coaxial shafts are journaled, 14 representing a supercharger drive shaft carrying a supercharger drive gear 15 at its right hand end. To the shaft 14 is splined a primary supercharger impeller 16 as at 17, the shaft continuing through the housing 11 and terminating in a piston element 18. Embracing, and journaled on the shaft 14 is a secondary hollow shaft 19 carrying, at its right hand end, a secondary supercharger impeller 20, and at its left hand end a cylinder 21 within which the piston 18 is slidably engageable. Slight axial freedom of the shaft 19 is permitted for a purpose hereinafter to be disclosed.

The primary impeller 16 is of conventional form comprising a back plate 24 on which are formed integral radial impeller vanes 25 open at their inner ends to an intake duct 26 and discharging substantially radially at their outer ends. A friction plate 28 is formed on the back side of the impeller. The secondary impeller 20 comprises a central web 29 carrying, at its outer periphery, an annular belt of impeller blades 30, the inner edges of which clear the outer ends of the blades 25 as at 31. The outer ends of the blades 30 run close to the vanes 32 of a conventional diffuser plate 33 carried by the housing element 10. A friction disc 34 is fixed toward the inner part of the member 29 so as to frictionally coact with the plate 28.

A fluid pressure line, from an engine oil pump or the like, connects to the housing 11 at 36, and by suitable drillings 37 and an annular recess 38 in the shaft 19, this pressure fluid may be admitted to the cylinder 21, selectively. When pressure fluid is admitted to the cylinder 21, the cylinder is moved toward the right with respect to the piston 18, thus engaging the friction faces 28 and 34 and effecting a unitary drive between the impellers 16 and 20. When pressure is cut off from the cylinder 21, fluid leakage will quickly relieve the frictional engagement permitting the secondary impeller 20 to idle rotationally while the primary impeller 16 continues to be driven from the power source. The connection 36 communicates through a shut-off valve 40 and a pressure pump 41, shown diagrammatically.

The location of the clutch is favorable for adequate cooling during slipping engagement, since heat will dissipate into the impeller wheels which normally run very cool due to the passage of large volumes of air over their, and their vane, surfaces.

The first stage of supercharging results from rotation of the primary impeller 16, while the secondary impeller 20 idles rotationally; in virtue of the small diameter of the primary impeller 16, the tip speed of its blades 25 is moderate. When the secondary impeller 20 is clutched for unitary rotation with the primary impeller, the two impellers in effect become a single impeller of large diameter whose tip speed, and thus available supercharge, is much greater than that afforded by the primary impeller alone, with, however, no change in the speed of rotation.

According to well known principles of supercharger design, the amount of supercharging in either stage will be determined by the impeller diameters and by the gear ratio between the impellers and the driving shaft.

The friction clutch and hydraulic shift therefor is a simple and direct arrangement for selectively driving the large diameter impeller with the small diameter impeller, but obviously, other means may be used for providing driving effort for the secondary impeller.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. A variable capacity blower comprising a first impeller having blades, means to rotate said impeller at a finite speed thereby producing an impeller blade speed proportional to its diameter; means to boost the output of said first impeller comprising a second impeller having blades, embracing and of larger diameter than the first impeller and selectively operable means to selectively drive said second impeller at unitary speed with the first or to leave it rotationally free, said boost being afforded by the greater tip speed of the second impeller due to its larger diameter, and a stationary ring of diffuser vanes embracing the secondary impeller through which one or both impellers discharge.

2. A variable capacity fluid blower comprising a first impeller having substantially radially extending blades, means to rotate said impeller at such a finite speed that work is done upon the fluid, a second impeller coaxial with the first, having substantially radial blades together embracing the blades of the first impeller and having an outer diameter substantially greater than the diameter of the blades of the first impeller, and means selectively operable to clutch said second impeller for unitary rotation with said first impeller to do additional work upon the fluid issuing from the first impeller or to declutch said second impeller for idling, and a stationary diffuser embracing said secondary impeller into which the impellers discharge.

3. In a supercharger, in combination, a primary rotatable impeller, a second annular rotating impeller embracing the first and selectively clutchable thereto, means selectively operable to clutch the second impeller to the first and to free the second impeller for idle rotation, and a stationary diffuser embracing both impellers.

4. In a supercharger, in combination, a pair of coaxial impellers having radially disposed blades, the blades of one impeller defining an annulus embracing the blades of the other impeller, and means selectively operable to leave the annular impeller rotationally free or to clutch same for unitary rotation with the other impeller, said selectively operable means comprising friction facings on respective impellers and mechanism to bodily move one of the impellers to effect frictional driving engagement between said impellers.

5. In a supercharger, in combination, a pair of coaxial impellers having radially disposed blades, the blades of one impeller defining an annulus embracing the blades of the other impeller, and means selectively operable to leave the annular impeller rotationally free or to clutch same for unitary rotation with the other impeller, said selectively operable means comprising friction facings on respective impellers and hydraulic mechanism to bodily move one of the impellers to effect frictional engagement of said facings.

6. In a supercharger, in combination, a driven primary rotating impeller, a second annular rotatable impeller, means selectively operable to clutch the impellers to one another for unitary rotation and for releasing the second impeller for idle rotation, and a stationary diffuser embracing both impellers into which the primary or both impellers discharge.

EROLD F. PIERCE